United States Patent [19]

Decombe et al.

[11] 4,080,708
[45] Mar. 28, 1978

[54] METHOD OF REPAIRING A DREDGE CUTTERHEAD

[75] Inventors: Albert Alphonse Decombe, Ste Foy les Lyon; Gerard Alexandre Zanini, St-Priest, both of France

[73] Assignee: ESCO Corporation, Portland, Oreg.

[21] Appl. No.: 749,291

[22] Filed: Dec. 10, 1976

[51] Int. Cl.² .............................................. B23P 7/00
[52] U.S. Cl. ...................................... 29/401 F; 37/67; 37/142 R; 29/418; 29/406; 29/464; 29/468; 29/559; 29/281.1; 29/401 D; 407/52
[58] Field of Search ............ 29/401 R, 401 F, 401 D, 29/418, 406, 464, 468, 105 R, 559, 200 P; 37/67

[56] References Cited

U.S. PATENT DOCUMENTS

| 892,977 | 5/1907 | Cantwell | 37/67 |
|---|---|---|---|
| 1,226,386 | 5/1917 | Sackett | 37/67 |
| 1,840,025 | 1/1932 | Daniels | 37/67 |
| 2,002,749 | 5/1935 | Neveling, Sr. | 37/67 |
| 2,090,790 | 8/1937 | Fray | 37/67 |
| 2,408,450 | 10/1946 | Schrader | 29/401 |
| 3,079,710 | 3/1963 | Larsen et al. | 37/142 |

*Primary Examiner*—C.W. Lanham
*Assistant Examiner*—V. K. Rising
*Attorney, Agent, or Firm*—Tilton, Fallon, Lungmus & Chestnut

[57] ABSTRACT

A method of repairing the teeth of a dredge cutterhead wherein at least two position openings are provided on the head for each tooth for receipt of a locating fixture for properly positioning a replacement tooth part.

4 Claims, 6 Drawing Figures

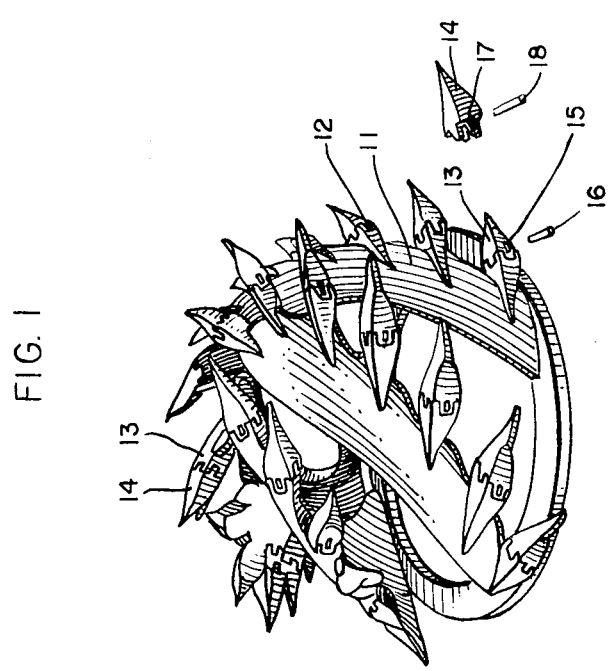
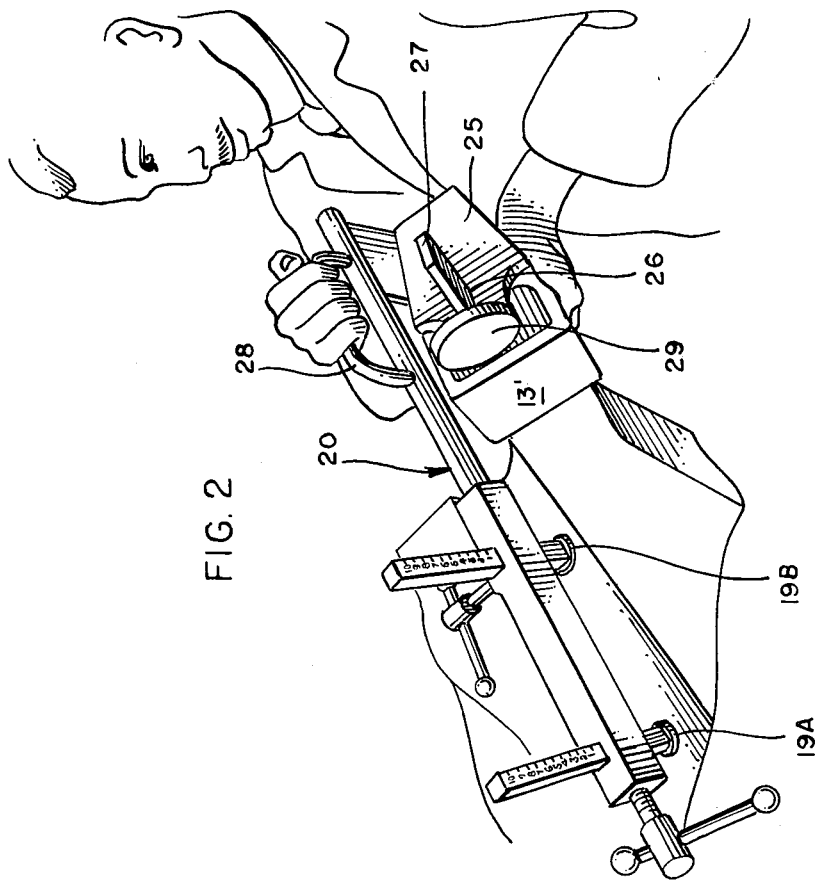

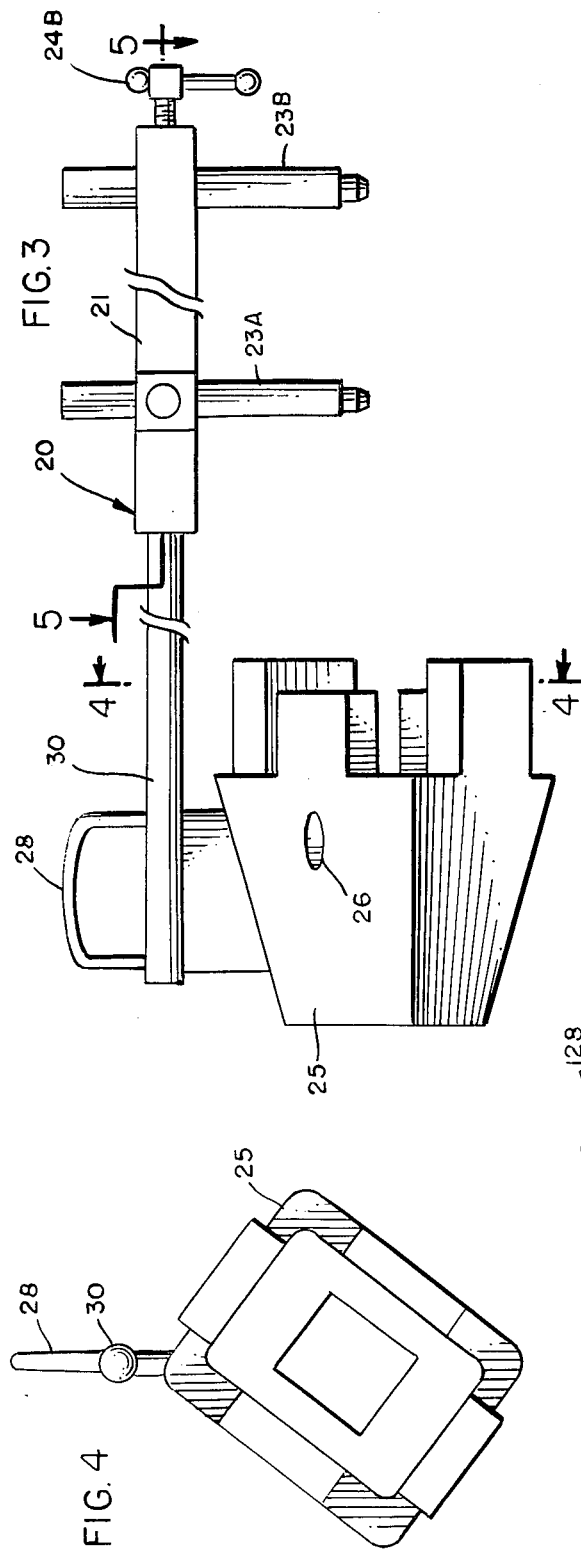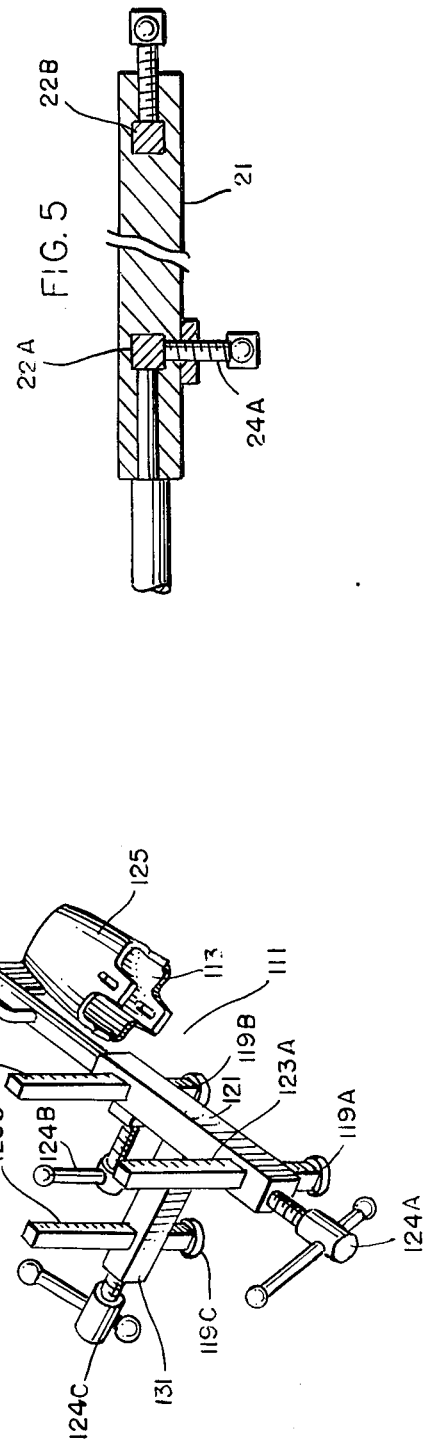

METHOD OF REPAIRING A DREDGE CUTTERHEAD

BACKGROUND AND SUMMARY OF INVENTION

This invention relates to a method of repairing a dredge cutterhead, and, more particularly, to a method of replacing the adapter or holder portions of the teeth mounted on the dredge cutterhead.

Dredge cutterheads are used for a variety of purposes such as offshore oil exploration. As such, they encounter a variety of stresses and operate under conditions abnormal for most excavating teeth — which are normally visible so as to immediately determine deterioration, failure, etc. Therefore, it is quite important that the teeth mounted on the dredge cutterhead be oriented in the optimum position for the particular cutterhead design. This is readily achievable for the initial installation but when repair of a tooth is required in the field, often times in the past the tooth has been mounted in a different orientation than that of the original — with the consequence of less optimum operation and chance of premature failure. Further, a misoriented or misaligned tooth could upset the dynamic balance of the dredge cutterhead so that even greater damage can occur than just to the tooth per se.

To overcome these problems and to maintain a dredge cutterhead, even after repair, in optimum condition, the intant invention contemplates the use of position openings provided initially on the dredge cutterhead for use in combination with a uniquely constructed fixture for the installation of a replacement tooth part.

Other objects and advantages of the invention may be seen in the details of the ensuing specification.

DETAILED DESCRIPTION

The invention is described in conjunction with the accompanying drawing, in which:

FIG. 1 is a perspective view of a cutterhead with one tooth (near the top) in exploded condition to show the relationship of the parts thereof;

FIG. 2 is an enlarged fragmentary perspective view showing the location openings and the fixture employed in tooth part replacement;

FIG. 3 is an elevational view, partially broken away of the fixture used according to the invention;

FIG. 4 is a sectional view taken along the line 4—4 of FIG. 3;

FIG. 5 is a fragmentary sectional view such as would be seen along the line 5—5 of FIG. 3; and FIG. 6 is a perspective view similar to FIG. 2 but of a modified form of fixture employed in the practice of the invention.

In the illustration given and with reference first to FIG. 1, the numeral 10 designates generally a dredge cutterhead which, in accordance with conventional design, is equippped with a plurality of spiral arms 11 and with each arm being equipped with a plurality of teeth 12 thereon. As illustrated, the cutterhead 10 has five arms 11 and each arm is equipped with eight teeth 12. It will be appreciated that different designs of cutterheads may have fewer or more arms and varying number of teeth on each arm according to the particular design.

As can be appreciated from the upper left hand portion of FIG. 1, each tooth 12 includes an adapter 13 fixed to the arm itself and a point 14 which is releasably locked to the adapter 13. For the purpose of this releasable mounting, the adapter 13 is equipped with a recess 15 extending therethrough in which a resilient plug 16 is mounted. The point or tip 14 is equipped with aligned openings 17 for the receipt of a locking pin 18. Further details of the adapter point and locking mechanism can be seen in U.S. Pat. No. 3,079,710.

Turning now to FIG. 2, a portion of the cutterhead arm 11 is seen in enlarged condition. For the purpose of properly locating a replacement adapter, the arm 11 is provided with location openings 19A and 19B at the time of manufacture, i.e., when the adapter is provided as original equipment. Although the usual repair of a dredge cutterhead consists of replacing the points 14 (so as to have new and sharper cutting edges), it is frequently necessary to replace the adapters as well. When it is considered that in the especially abrasive conditions the life of a point may be of the order of one day or so and that an adapter becomes inoperably worn after 5 to 10 points have been replaced thereon, it is apparent that adapter replacement is likewise frequent. To that end, the invention contemplates a unique fixture generally designated 20 for use in combination with the opening-equipped arms.

As can be better appreciated from the second drawing sheet and more particularly FIGS. 3-5, the fixture 20 includes a body 21 of generally elongated form.

The body 21 (as best seen in FIG. 5) is equipped with a pair of slots 22A and 22B extending therethrough. Slidably received within the slot 22A and 22B are spindles 23A and 23B. For clamping the spindles 23A and 23B in proper position, the body 21 is equipped with threaded clamps 24A and 24B, respectively.

At one end, the body 21 is equipped with a holder 25 which is shaped much like the point 14, i.e., being equipped with a socket for the receipt of an adapter. The holder 25 is equipped with holes 26 (like the holes 17) for the receipt of a locking pin.

As can be appreciated from a consideration of FIG. 2, a replacement adapter 13' is received within the holder 25 and temporarily secured therein by means of a locking pin 27 inserted through the holder holes 26 and mating, aligned opening (not shown) in the replacement adapter 13'.

The body 20 is provided with a handle 28 (still referring to FIG. 2) which permits the artisan installing the replacement adapter 13' to suitably grasp the fixture 20 for proper positioning relative to the arm 11.

OPERATION

At the time of manufacture, the openings 19A and 19B are provided within the arm 11 for each tooth adapter 13. Once the adapter is suitably fixed to the arm 11 — as by welding —, the fixture 20 is oriented so as to receive the already mounted adapter 13 and the spindles 23A and 23B extended so as to fit snuggly within the openings 19A and 19B. The spindles 23A and 23B are equipped with markings or indexes and the amount the two spindles are extended relative to the body 21 is noted and recorded. This is done for each of the adapters and, at the same time, the angular orientation is also noted and recorded — and for this purpose an angle indicator is advantageously mounted temporarily on the holder 25. A suitable angle indicator can make use of the level or bubble principle and is advantageously temporarily attachable by means of a magnet.

The various readings of the extensions A and B and the angles noted for each tooth are then tabulated and sent to the user along with the cutterhead.

When it becomes necessary to replace the adapter in the field, the impaired adapter is removed — as by employing a cutting torch. The new or replacement adapter 13' is placed within the holder 26 and is temporarily secured therein by means of the locking pin 27. Thereafter, the spindles 23A and 23B are adjusted to the dimensions set forth on the previously prepared chart. Thereafter, the spindles are inserted into the openings 19A and 19B and the replacement adapter 13 is given the correct angular orientation using the angle indicator 29 by rotating the shaft 30 which is journaled within the body 21. Thereafter the replacement adapter 13' is tack welded to the arm 11 and the device 20 removed. Thereafter the adapter 13' is securely welded to the arm 11.

An alternative procedure for installing a replacement is shown in FIG. 6. In that view the fixture is designated generally by the numeral 120 and is seen to be equipped with a body 121 having an extension 130 equipped with the handle 128. Again, a holder 125 is provided for the replacement adapter 113'. The fixture 120 differs from that previously described in having a laterally projecting arm 131 which carries a spindle 123C in addition to the spindles 123A and 123B carried by the body 121. A suitable clamp 124C is provided analogous to the clamp 124A provided for the spindle 123A.

With the fixture 120, three openings are provided in the arm 111 at the time of manufacture, i.e., a third opening 119C being provided for cooperation with the spindle 123C. Thus, it is only necessary for the artisan to set the three spindles to the correct setting and thereafter insert the spindles into the associated openings where upon the replacement adapter 113' is properly positioned for tack welding.

Through the practice of the invention, the replacement adapter or nose of a tooth on the dredge cutterhead can be precisely positioned with a minimum of effort.

We claim:

1. A method of repairing a dredge cutterhead wherein said head has a plurality of teeth disposed thereon at different locations and different angles, each tooth including an adapter fixed to said head and a point removably mounted on said adapter, characterized by the fact of equipping said head at the time of manufacture thereof with at least two position openings for each tooth, removing a worn adapter, providing a fixture adapted to support a replacement adapter and having adjustable spindles adapted to be inserted into said openings, adjusting said spindles to predetermined extensions, supporting replacement adapter on said fixture, inserting said spindles into said openings and orienting said fixture to a predetermined angle, and attaching said replacement adapter to said head.

2. The method according to claim 1 in which said fixture includes a relatively elongated body having a pair of spaced apart slots extending transversely therethrough, a spindle slidably mounted in each slot, a clamp on said body for clamping each spindle in a predetermined extended position relative to said body, said body adjacent one end thereof being equipped with an adapter holder, and a lock on said holder for releasably locking said replacement adapter in said holder.

3. The method according to claim 1 or claim 2 in which said fixture is equipped with an angle indicator.

4. The method according to claim 1 or claim 2 in which said head is equipped with a third position opening and said fixture is equipped with a third adjustable spindle for insertion therein.

* * * * *